Patented June 19, 1951

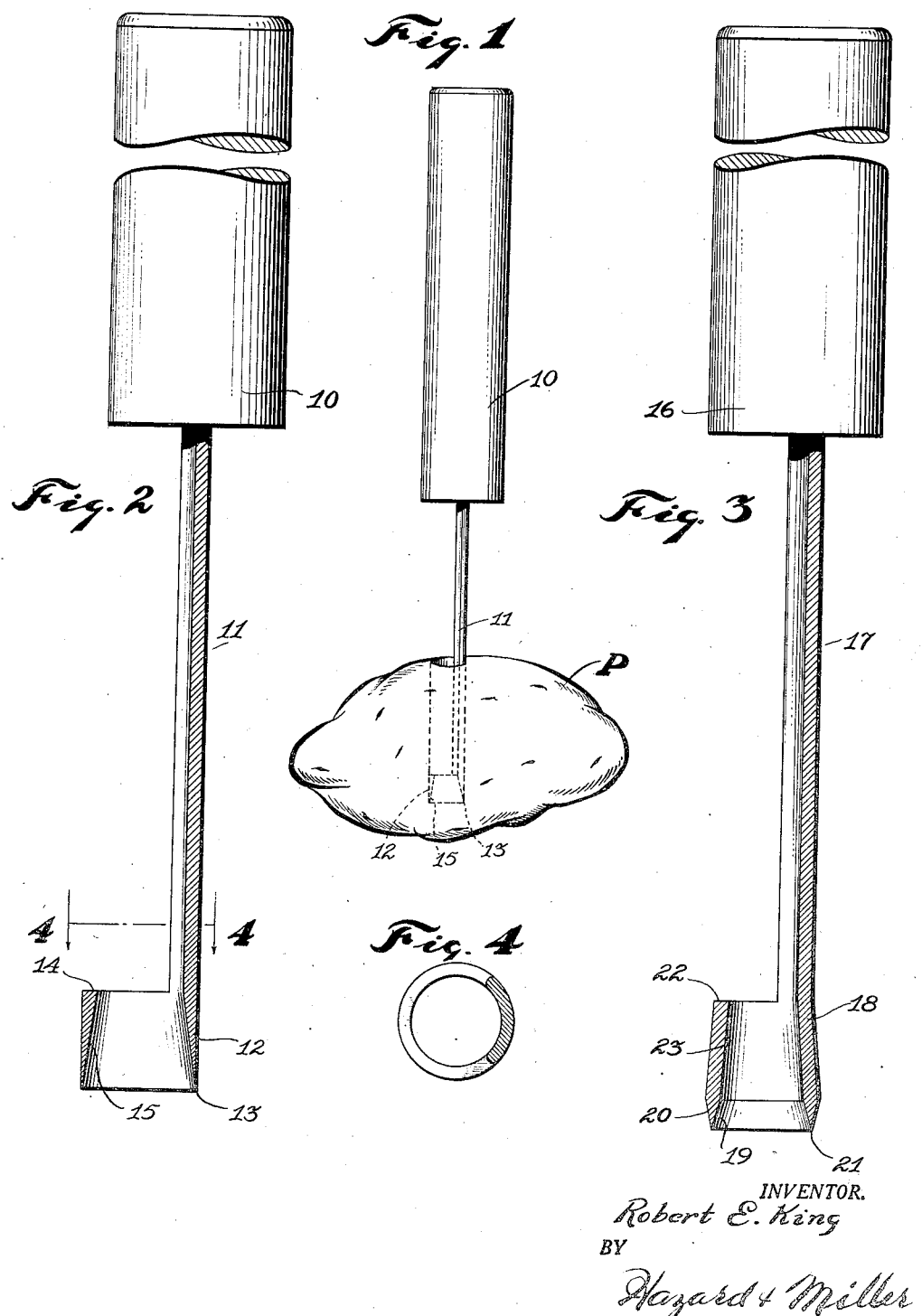

2,557,191

UNITED STATES PATENT OFFICE 2,557,191

POTATO PUNCH

Robert E. King, Fillmore, Calif.

Application July 18, 1947, Serial No. 761,809

2 Claims. (Cl. 30—316)

This invention relates to a device that may be termed a potato punch.

An object of the invention is to provide a simple and easily operated tool that may be thrust into a potato for the purpose of extracting a small core therefrom.

In cooking large potatoes, either Irish potatoes or sweet potatoes, it is frequently desirable to form a small opening in the potato at approximately the center thereof to permit the entry of heat to the center of the potato. This is particularly true in either baking potatoes or boiling potatoes with the skins thereon. In baking a large potato, for example, if the potato is left intact the heat surrounding the potato must enter from its outside surfaces so that the length of time to complete the baking is materially prolonged. On the other hand, if a small opening is formed in the center of the potato to permit entry of the heat to the center of the potato, the potato, even if of considerable size, may be cooked in a comparatively short time in that the cooking heat may penetrate the potato not only from its exterior surfaces but from the walls of the opening formed therein.

More specifically, the object of the invention is to provide a device that may be thrust into the potato to cut a small core therein and which is so designed as to automatically break off and withdraw the cut core from the potato on withdrawal of the device leaving the potato substantially intact except for the small neatly formed opening therein.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation illustrating the manner in which the potato punch embodying the present invention may be used;

Figure 2 is a view in side elevation of one form of potato punch embodying the present invention;

Figure 3 is a view similar to Figure 2 but illustrating an alternative form of construction; and Figure 4 is a horizontal section taken substantially upon the line of 4—4 of Fig. 2.

Referring to the accompanying drawings wherein similar reference characters designate similar parts throughout, it will be understood and appreciated that the devices as illustrated on the drawing are shown on a materially enlarged scale and in a somewhat exaggerated manner to properly illustrate features of the construction.

One form of potato punch embodying the invention comprises a suitable handle indicated at 10 from which there extends a shank 11. This shank may or may not be arcuate in cross section and is of adequate length to extend the annular cutter carried thereby through any large sized potato such as that indicated at P. At the lower end of the shank 11, there is either integral therewith or attached thereto an annular cutter designated at 12 presenting at its bottom a sharpened annular cutting edge 13. This cutter presents at its top a horizontal shoulder 14 and is characterized by the fact that the inner faces 15 of its annular walls converge upwardly throughout substantially their entire length from the cutting edges 13 to the shoulder 14. The annular cutter, as shown in Fig. 2, has a cylindrical exterior face and tapers uniformly in thickness from the cutting edge 13 to the shoulder 14. It is disposed laterally with respect to the longitudinal axis of the shank 11.

In the construction illustrated in Fig. 3, the potato punch consists of a handle 16 to which is connected a shank 17 carrying the laterally disposed annular cutter 18. In this form of construction the thickness of the walls of the cutter may be uniform or substantially so from top to bottom with the exception of where the bottom of the cutter is interiorly and exteriorly beveled as indicated at 19 and 20 to sharpen the annular cutting edge 21. The cutter presents at its top a substantially horizontal shoulder 22 and in this form of construction also the faces 23 of the annular walls converge upwardly from substantially the cutting edges 21 to the shoulder 22.

While the size of the annular cutter may vary, I find it advantageous to have the average diameter of the cutter approximately ¼ inch and the height of the cutter approximately the same length. In the use of the device, the cutter is merely thrust into the potato P by means of the shank and handle and in the course of the inward movement the sharpened cutting edges cut a relatively small core in the potato. This core passes upwardly through the cutter and between the upwardly convergent inner faces of its walls. The pulp of the potato is to some extent compressed and is consequently also compressed slightly in a horizontal position while passing upwardly through the cutter. After passing by the shoulder this core is allowed to expand or return to its normal or initial shape thus to some extent locking itself over the top of the shoulder or top edge of the cutter. When the tool is withdrawn from the potato this locking action between the core and the top edge of the cutter is sufficient to enable the core to be broken off and lifted out of the body of the potato by the potato punch. In this manner, it is not essential that the device be thrust entirely through the potato but instead it may be thrust into the potato only a sufficient distance to enable the heat to enter the opening left by the core and be evenly distributed throughout the interior of the potato.

The annular cutter may be made in several different manners such as, for example, by forming wings at the sides of the bottom of the shank and bending these into meeting engagement with each other or the cutter may be made separately and attached to the shank such as by spot welding or the equivalent.

From the above described construction it will be appreciated that an improved kitchen utensil has been provided which can be easily used to cut and automatically remove its own small core from a potato or like vegetable to facilitate cooking.

Various changes may be made in the details of construction without departing from the spirit and scope of the invention as defined by the appended claims.

I claim:

1. A potato punch comprising a handled shank having at its lower end an inexpansible annular cutter adapted to be thrust by the shank into a potato, the cutter having its axis arranged approximately parallel to the length of the shank and being characterized by having walls the interior surfaces of which converge upwardly away from the cutting edges on the bottom thereof throughout substantially the entire length of the walls, the top edges of the walls being arranged at approximately right angles to the interior surfaces thereof whereby a core of potato cut by the cutter will be slightly compressed on passing through the cutter and then allowed to expand over the top of the cutter so that on withdrawal of the cutter from the potato the core will be broken off and withdrawn therewith.

2. A potato punch comprising a handled shank having at its lower end an inexpansible annular cutter adapted to be thrust by the shank into the potato, the cutter having its axis arranged approximately parallel to the length of the shank and being characterized by having walls the interior surfaces of which converge upwardly away from the cutting edges on the bottom thereof throughout substantially the entire length and which terminate at a horizontal shoulder extending the major portion of the distance about the top of the annular cutter whereby a core of potato cut by the cutter will be slightly compressed on passing through the cutter and then allowed to expand over the top of the cutter so that on withdrawal of the cutter from the potato the core will be broken off and withdrawn therewith.

ROBERT E. KING.

REFERENCES CITED

The following references are of record in the file of this patent:

UNITED STATES PATENTS

| Number | Name | Date |
|---|---|---|
| 112,312 | Beal | Mar. 7, 1871 |
| 544,475 | Booth et al. | Aug. 13, 1895 |
| 648,540 | Thacher | May 1, 1900 |
| 1,557,464 | Mick | Oct. 13, 1925 |